United States Patent
Tourapis et al.

(10) Patent No.: US 10,432,961 B2
(45) Date of Patent: Oct. 1, 2019

(54) VIDEO ENCODING OPTIMIZATION OF EXTENDED SPACES INCLUDING LAST STAGE PROCESSES

(71) Applicant: Apple Inc., Cupertino, CA (US)

(72) Inventors: Alexandros Michael Tourapis, Milpitas, CA (US); Yeping Su, Sunnyvale, CA (US); David William Singer, San Francisco, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 245 days.

(21) Appl. No.: 15/067,041

(22) Filed: Mar. 10, 2016

(65) Prior Publication Data

US 2016/0269739 A1 Sep. 15, 2016

Related U.S. Application Data

(60) Provisional application No. 62/130,973, filed on Mar. 10, 2015.

(51) Int. Cl.
*H04N 19/117* (2014.01)
*H04N 19/82* (2014.01)
(Continued)

(52) U.S. Cl.
CPC ......... *H04N 19/517* (2014.11); *H04N 19/117* (2014.11); *H04N 19/132* (2014.11);
(Continued)

(58) Field of Classification Search
CPC ...... H04N 19/517; H04N 19/86; H04N 19/44; H04N 19/40; H04N 19/152; H04N 19/147;
(Continued)

(56) References Cited

U.S. PATENT DOCUMENTS

| 6,104,434 A * | 8/2000 | Nakagawa | H04N 19/105 375/240.16 |
| 2005/0229231 A1* | 10/2005 | Lippincott | H04N 19/196 725/131 |

(Continued)

FOREIGN PATENT DOCUMENTS

| CN | 103220510 A | 7/2013 |
| CN | 104813661 A | 7/2015 |

(Continued)

OTHER PUBLICATIONS

International Patent Application No. PCT/US2016/021852; Int'l Search Report and the Written Opinion; dated Jun. 30, 2016; 14 pages.

*Primary Examiner* — Susan E. Hodges
(74) *Attorney, Agent, or Firm* — BakerHostetler

(57) ABSTRACT

A video coding system may include an encoder performs motion-compensated prediction on a video signal in a second format converted from an input format of the video signal. The video coding system may also include a decoder to decode portions of the encoded video, and a filtering system that filters portions of the decoded video, for example, by deblocking filtering or SAO filtering, using parameters derived from the video signal in the input format. A prediction system may include another format converter that converts the decoded video to the input format. The prediction system may select parameters of the motion-compensated prediction based at least in part on a comparison of the video signal in the input format to decoded video in the input format.

26 Claims, 9 Drawing Sheets

(51) Int. Cl.
*H04N 19/169* (2014.01)
*H04N 19/517* (2014.01)
*H04N 19/70* (2014.01)
*H04N 19/61* (2014.01)
*H04N 19/132* (2014.01)
*H04N 19/182* (2014.01)
*H04N 19/59* (2014.01)
*H04N 19/147* (2014.01)
*H04N 19/152* (2014.01)
*H04N 19/40* (2014.01)
*H04N 19/44* (2014.01)
*H04N 19/86* (2014.01)

(52) U.S. Cl.
CPC ......... *H04N 19/147* (2014.11); *H04N 19/152* (2014.11); *H04N 19/182* (2014.11); *H04N 19/40* (2014.11); *H04N 19/44* (2014.11); *H04N 19/59* (2014.11); *H04N 19/61* (2014.11); *H04N 19/70* (2014.11); *H04N 19/82* (2014.11); *H04N 19/86* (2014.11)

(58) Field of Classification Search
CPC ...... H04N 19/117; H04N 19/59; H04N 19/82; H04N 19/182; H04N 19/132; H04N 19/61; H04N 19/70

USPC ........................................................ 375/240
See application file for complete search history.

(56) References Cited

U.S. PATENT DOCUMENTS

| | | | |
|---|---|---|---|
| 2012/0026288 A1* | 2/2012 | Tourapis | H04N 19/597 348/43 |
| 2014/0003528 A1* | 1/2014 | Tourapis | H04N 19/30 375/240.16 |
| 2014/0112394 A1* | 4/2014 | Sullivan | H04N 19/46 375/240.26 |
| 2014/0146875 A1 | 5/2014 | Chong et al. | |
| 2015/0016550 A1* | 1/2015 | Kim | H04N 19/80 375/240.29 |
| 2015/0249833 A1 | 9/2015 | Tourapis et al. | |

FOREIGN PATENT DOCUMENTS

| | | |
|---|---|---|
| EP | 1901562 A1 | 3/2008 |
| EP | 2627088 A1 | 8/2013 |
| EP | 2725790 A1 | 4/2014 |
| WO | 2013/064661 A1 | 5/2013 |
| WO | WO 2015/006662 A2 | 1/2015 |

* cited by examiner

100

200

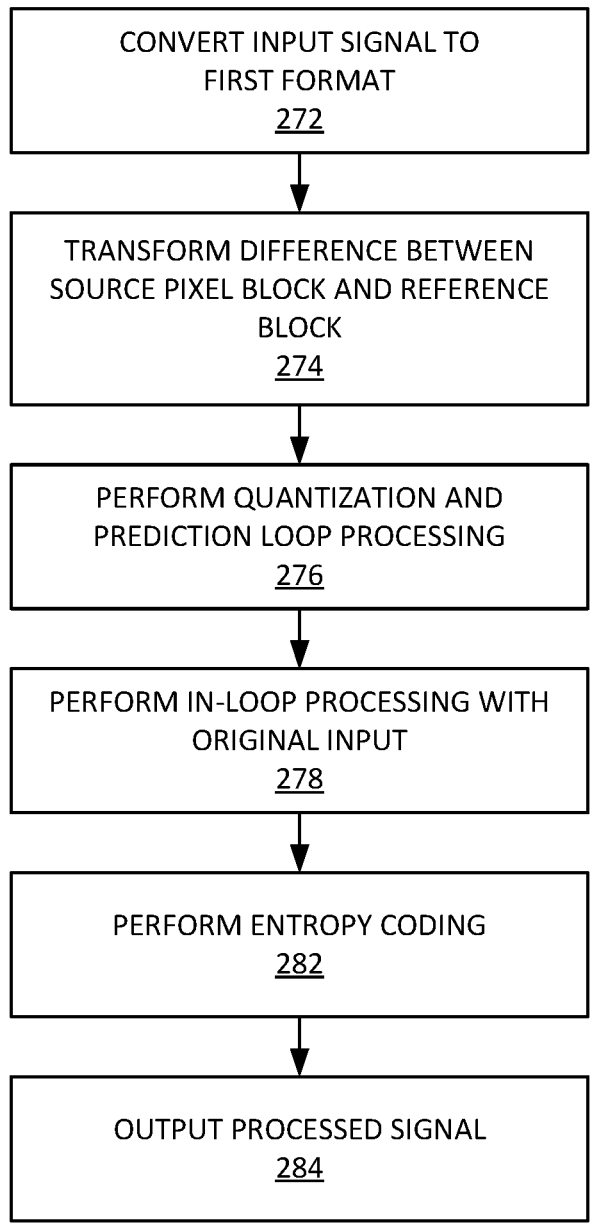

300

400

490

500

590

600

VIDEO ENCODING OPTIMIZATION OF EXTENDED SPACES INCLUDING LAST STAGE PROCESSES

CLAIM FOR PRIORITY

The present disclosure benefits from priority of U.S. application Ser. No. 62/130,973, filed Mar. 10, 2015, entitled "Video Encoding Optimization of Extended Spaces Including Last Stage Processes," the entirety of which is incorporated by reference.

BACKGROUND

The present invention relates to video coding techniques. Typical video distribution systems include at least one video source and at least one receiving device. The video content may be distributed over a network or over fixed media. To keep complexity and cost low, video content is typically limited in dynamic range, e.g., 8-10 bit signal representations and 4:2:0 color format. Recent advances in display technology, however, have opened the door for the use of more sophisticated content (also referred to as "higher quality content"), including content characterized as High Dynamic Range (HDR) and/or wide color gamut (WCG), as well as content with increased spatial and/or temporal resolution. This higher quality content is typically converted to a lower range using a Transfer Function (TF) and color conversion before encoding for distribution using a video codec system. These steps can introduce banding and other artifacts that may impact and substantially degrade the quality of the video content when decoded and displayed.

One technique for improving encoding performance in the context of material available in a higher quality representation when encoded at a lower quality representation is considering original content characteristics during an encoding process. That is, for the motion estimation and mode decision processes, instead of computing distortion in a space native to the encoding space ("native space"), distortion is computed in a "target space" such as an original space or an extended space. By first converting the data to this target space before performing the appropriate computations, the encoding and quality may be improved, i.e., bitrates may be reduced. Video encoding optimization with extended spaces with respect to processes such as intra-mode decision, motion estimation, and mode decision is further discussed in U.S. patent application Ser. No. 14/503,200 filed on Sep. 30, 2014, the entirety of which is incorporated herein by reference.

However, typical techniques do not address in-loop processing mechanisms such as de-block filtering and sample adaptive offset (SAO) filtering. These in-loop processing components may impact the characteristics of a signal in both the native and extended spaces. If extended space optimization is considered only at stages prior to the application of in-loop processes, an "extended space" optimized decision (such as at a motion estimation and/or mode decision stage) may be negated by the in-loop processes.

Therefore, the inventor(s) perceived a need in the art for an improved encoding process that accounts for in-loop processes and is capable of handling higher quality content that results in an improved experience at the decoder compared to conventional encoders, and may reduce banding and blockiness, improve resolution and subjective quality, as well as reduce other artifacts and improve compression.

BRIEF DESCRIPTION OF THE DRAWINGS

FIG. 2A is a flowchart of a method 290 to encode data.

DETAILED DESCRIPTION

Figure 1:
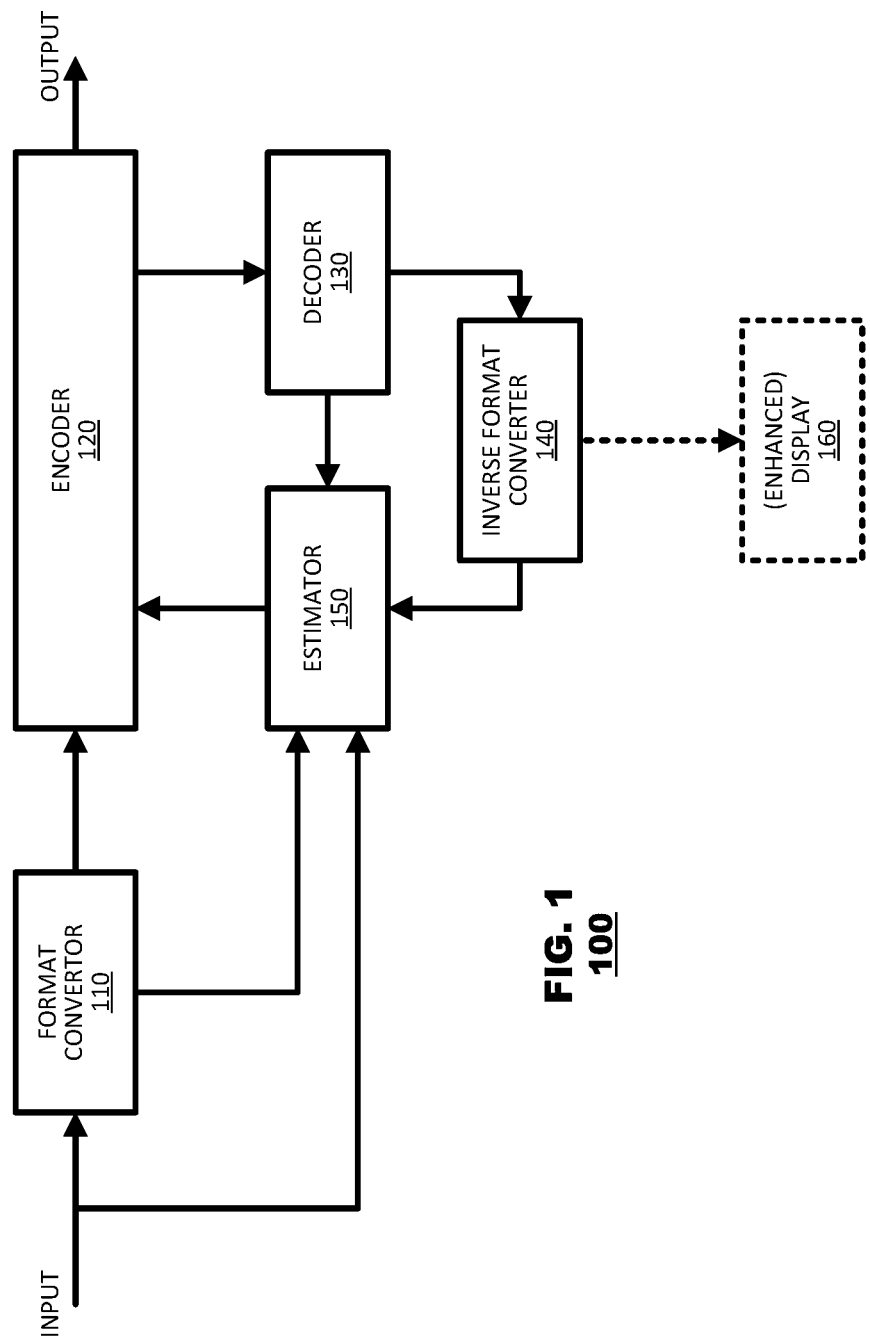
FIG. 1 illustrates an encoder system 100 according to an embodiment of the present invention.

Some video codecs may include in-loop processing components. In-loop processing is termed "in-loop" because the outcome of in-loop processing may be considered as prediction by other processes and samples during an encoding process. For instance, modern video codecs such as MPEG-4 AVC/H.264 or HEVC (currently published as ISO/IEC 23008-2 MPEG-H Part 2 and ITU-T H.265) may include in-loop post-processing mechanisms such as de-blocking and sample adaptive offset (SAO). In-loop processing mechanisms can provide both objective and subjective video quality benefits, because they can reduce artifacts such as those due to the prediction and quantization processes.

However, if extended space optimization is considered only at stages prior to application of in-loop processes, an extended space optimized decision may not be as optimal or efficient as intended, because the decision may be negated by in-loop processes and decisions. Using the example of an HEVC codec, it is possible that SAO parameter optimization accounts for video data in a native space without accounting for an extended space. Since SAO is typically one of the last stages of encoding, such a decision would be important to a final outcome and the display process. This concept applies to other codecs that may include post-processing blocks (e.g., in-loop and/or out-of-loop processing) after the prediction/motion compensation and residual addition blocks, which are commonly employed by such coding schemes.

Methods and systems of the present disclosure may apply extended space optimization to one or more of the last stages of the encoding process. The "last stages" may include the stages of the encoding process where a predefined level of processing is expected. "Last stages" may also be referred to as "last mile." In an embodiment, in the "last stage" no processing is expected. In another embodiment, a small amount of processing is expected. For example, a level of processing associated with a last stage may be a level of processing for an unknown or unspecified post-processing scheme performed after decoding, where reconstructed samples are those added in the reference buffer for future prediction.

Operations on the reconstructed samples typically depend on characteristics of the last stage(s). For example, the last stage(s) may provide information about operations on the reconstructed samples such as, among others, chroma sampling, a color space domain, bit-depth, and any interdependencies between different components (e.g. sample values). The last stage(s) may also provide information about how operations are signaled and/or used during reconstruction.

Using the example of SAO, an embodiment may include processing luma and color/chroma components separately.

Applying the process to a typical encoder, luma samples may be analyzed to determine "optimal" SAO values given criteria, e.g. a rate-distortion based criterion. Similar decisions may also be made for each chroma component. Note that in HEVC, although different chroma SAO values may be signaled for each component, the SAO mode is typically shared between the components, thus creating dependency between the shared components during SAO mode decision. It is possible that such a dependency is not present for other codecs, including those that may be developed in the future. The concepts described herein apply equally to those other codecs.

Although the description herein pertains to in-loop processing, the described concepts apply as well to post-processing mechanisms, which may benefit from encoding optimization in extended spaces. For example, other post-processing mechanisms have also been proposed and/or used by other codecs, including sharpening and dithering methods, "adaptive loop-filtering" (ALF), and over-complete de-noising.

In an example, a video compression method comprises converting a video signal from a first format to a format used by a video encoder. The method may further comprise coding the converted video signal using selected coding parameters, and decoding coded data of reference pictures output by the video encoder. The method may further comprise filtering the decoded data of reference pictures using parameters derived from the video signal in the first format, and storing the filtered decoded pictures in a decoded picture buffer.

In an example, a video coding system may comprise a first format converter that converts a video signal from a first format to a second format used by a video codec. The first format may be of higher spatial and/or temporal resolution than the second format. The two formats may also differ in color space, transfer function, bit-depth precision, and even have different chroma resolutions. The system may further comprise the video codec. The codec may include an encoder that performs motion-compensated prediction on the video signal in the second format, a decoder that decodes portions of coded video output by the encoder, a filtering system that filters output of the decoder using filtering parameters derived from video in the first format, a decoded picture buffer to store decoded pictures output by the filtering system, and a prediction system that selects parameters of the motion-compensated prediction.

The video coding system may, in some instances, further comprise a second format converter that converts pictures stored in the decoded picture buffer to the first format. The prediction system may select parameters of the motion-compensated prediction based at least in part on a comparison of the video signal in the first format and the decoded pictures converted to the first format.

In an example, a non-transitory computer readable medium may have stored thereon processor-executable program instructions that, when executed by a processing device, causes the device to perform operations for coding a video signal. The operations may include converting a video signal from a first format to a second format and coding the converted video signal. The coding of the converted video signal may be based on motion-compensated prediction. The operations may further include decoding portions of the coded video, filtering the decoded video using parameters derived from the video signal in the first format, storing the filtered picture data in a decoded picture buffer, and converting the decoded portions from the second format to the first format.

The non-transitory computer readable medium may, in some instances, also include instructions for converting reference frames to the first format and then predicting content according to the motion-compensated prediction. The content prediction may be based at least in part on a comparison between the video in the format used by the video encoder and the decoded reference frames, and an estimate of distortion measured between the first format of the video and the decoded reference frames converted to the first format.

FIG. 1 illustrates an encoder system 100 according to an embodiment of the present invention. The encoder system 100 may include a format converter 110, an encoder 120, a decoder 130, an inverse format converter 140, and an estimator 150. In an embodiment, the encoder system 100 may also include an "enhanced" display 160.

The format converter 110 may include an input for an input signal to be coded. The format converter 110 may convert the format of an input signal to a second format. The format converter 110, for example, may perform down-conversion that converts a higher resolution input signal to a lower resolution. For example, the format converter 110 may convert an input signal that is a 12 bit signal with 4:4:4 color format, in a particular color space, e.g. RGB ITU-R BT.2020, and of a particular transfer function (TF) type to a 10 bit signal with a 4:2:0 color format, in a different color space, and using a different TF. The signals may also be of a different spatial resolution.

The encoder 120 may be coupled to the format converter 110. The encoder 120 may receive the format converted input signal generated by the format converter 110. The encoder 120 may perform coding operations on the converted input signal and generate coded video data, which is outputted from the encoder system 100. The output signal may then undergo further processing for transmission over a network, fixed media, etc.

The encoder 120 may exploit temporal and spatial redundancies in the video data. In an embodiment, the encoder 120 may perform motion compensated predictive coding. Different embodiments of encoder 120 are described below in further detail.

The decoder 130 may be coupled to the encoder 120. The decoder 130 may decode the coded video data from the encoder 120. The decoder 130 may include a decoder picture buffer (DPB) to store previously decoded pictures.

The inverse format converter 140 may be coupled to the decoder 130. The inverse format converter 140 may convert the decoded data back to the format of the original input signal. The inverse format converter 140 may perform an up-conversion that converts lower or different resolution and/or formatting data to a higher or different resolution and/or formatting. For example, the inverse format converter 140 may convert the decoded data that is a 10 bit signal with the 4:2:0 color format and of a particular TF, to a 12 bit signal in a 4:4:4 color format, and with a different TF.

In an embodiment, bit-depth up-conversion may be performed by a right shift operation, a multiplication operation by a value, bilateral filtering, or other suitable operations. In an embodiment, chroma upsampling (e.g., 4:2:0 to 4:4:4) may be performed by an FIR interpolation filter or other suitable operations. Color space conversion may include a matrix multiplication. Moreover, other traits may be converted (and inverse converted) such as resolution, TF, linear data (e.g., floating point) to a floating or fixed point representation using a particular, potentially perceptually optimized, TF, etc. For example, the input signal may be converted (and inverse converted) from one TF to another TF using suitable techniques.

The estimator 150 may estimate errors and/or other factors in the coding operation. In an embodiment, the estimator 150 may calculate a distortion metric and search the decoded picture data for image data to serve as a prediction reference for new frames to be coded by the encoder 120. In an embodiment, the estimator 150 may receive the original and format converted input signals as well as the decoded data before and after inverse format conversion as inputs, and may make its decisions accordingly. In an embodiment, the estimator 150 may select coding parameters such as slice type (e.g., I, P, or B slices), intra or inter (single or multi-hypothesis/bi-pred) prediction, the prediction partition size, the references to be used for prediction, the intra direction or block type, weighted prediction, and motion vectors among others.

The distortion metric used in the encoding decision process may be, for example, the mean or sum of absolute differences (MAD or SAD), the sum of absolute transformed differences (SATD), the mean or sum of square differences/errors (MSE or SSE), the peak signal to noise ratio (PSNR), the structural similarity index (SSIM), and other suitable operations that may also involve other signal characteristics such as brightness, texture (e.g., variance), edges or other information. In an embodiment, the distortion computations may be performed at a variety of stages, e.g., at the intra prediction and full-pixel or half-pixel motion estimation stages, during quantization such as trellis based quantization decision process, during the coding unit/macroblock/block mode decision, picture or sequence level. A coding unit may include: a block, macroblock, coded block, coded tree unit, region, slice, tile, picture, and/or multiple pictures within a particular codec. The computation may involve predicted samples and/or fully reconstructed (prediction+inverse quantized/transformed residuals). In an embodiment, the distortion computations may also include an estimate or an exact computation of the bits involved for coding any associated information to the encoding, e.g. mode information, motion vectors or intra prediction modes, quantized transform coefficients etc. Distortion and bitrate may be combined into a rate-distortion criterion, e.g. using the Lagrangian optimization formulation of $J=D+\lambda*R$, where D is the distortion, R is the rate, and $\lambda$ is the Lagrangian multiplier.

In an embodiment, an "enhanced" display 160 may be coupled to the inverse format converter 140 to display the decoded video data. The enhanced display 160 may be configured to display the expanded characteristics provided in the original input signal.

The encoding system 100 of FIG. 1 provides improved performance over conventional systems that base their encoding on the "in process" signal (lower quality/resolution/bit-depth/chroma sampling formatted signal). The encoding system 100, on the other hand, optimizes encoding operations by minimizing distortion versus the original (higher quality/resolution) input signal. Therefore, the visual experience of the viewer is improved without adding complexity to the target decoder.

In an embodiment, besides bit-depth and chroma format differences, the original input signal and the "in process signal" (i.e., format converted signal) may also differ with respect to other aspects such as resolution, frame-rate, color space, TF, etc. For example, the original input signal may be represented as a floating-point representation (e.g., images provided using the OpenEXR format) but may have to be coded using a power-law gamma or logarithmic TF, among others. These other aspects may be considered by the encoder system to provide appropriate inverse format conversion.

Figure 2:
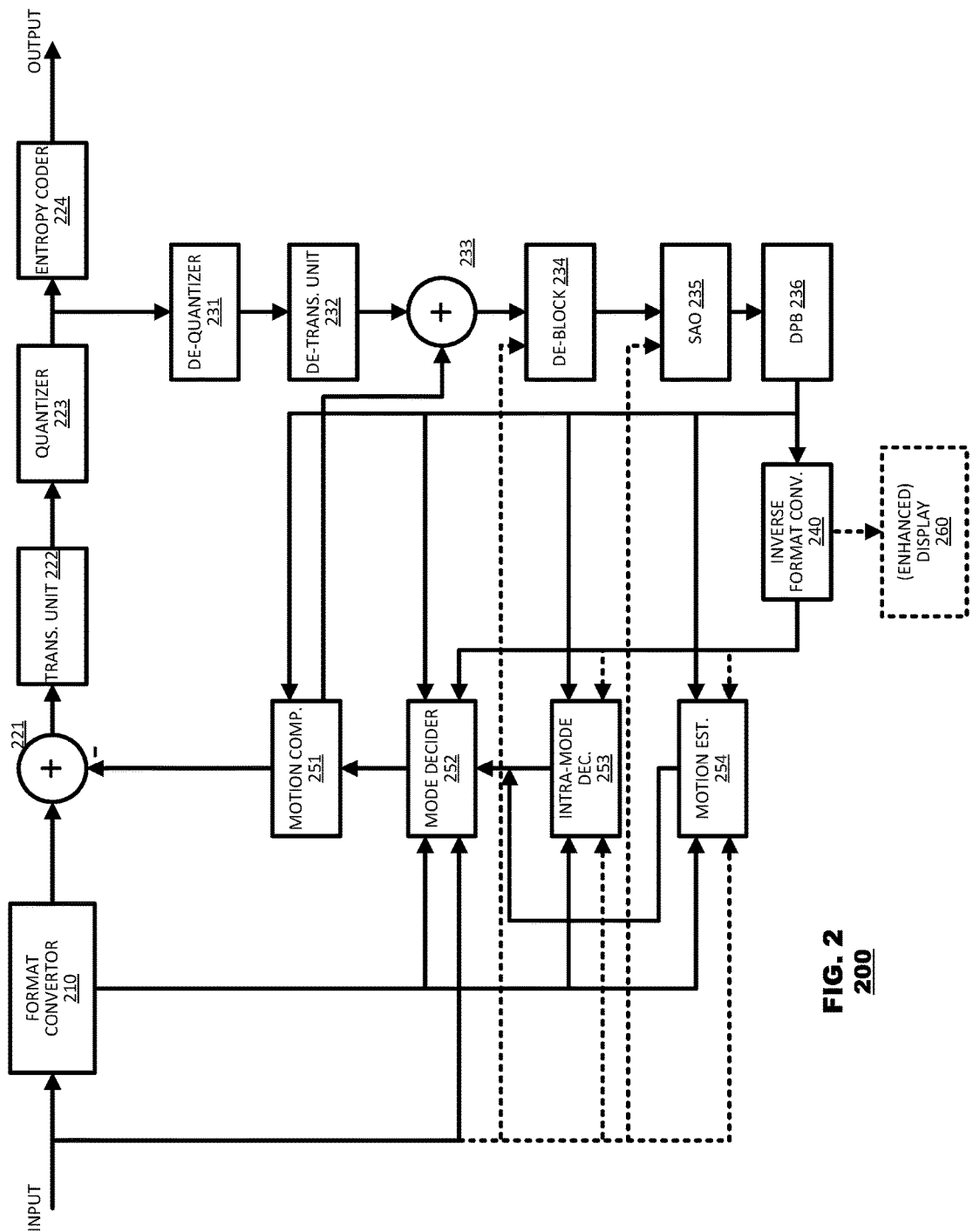
FIG. 2 illustrates an encoder system 200 according to an embodiment of the present invention.

FIG. 2 illustrates an encoder system 200 according to an embodiment of the present invention. FIG. 2A is a flowchart of a method 290 to encode data. Method 290 may be implemented by encoder system 200.

The encoder system 200 shown in FIG. 2 may include: a format converter 210, a subtractor 221, a transform unit 222, a quantizer unit 223, an entropy coder 224, a de-quantizer unit 231, a de-transform unit 232, an adder 233, a de-blocking unit 234, an SAO filter 235, a decoder picture buffer (DPB) 236, an inverse format converter 240, a motion compensation/intra prediction unit 251, a mode decider unit 252, an intra-mode decider unit 253, and a motion estimator unit 254. In an embodiment, the encoder system 200 may also include an "enhanced" display 260.

The format converter 210 may include an input for an input signal to be coded. The format converter 210 may convert the format of an input signal to a second format (box 272 of FIG. 2A). The format converter 210, for example, may perform down-conversion that converts a higher resolution input signal to a lower resolution. For example, the format converter 210 may convert an input signal that is a 12 bit signal with 4:4:4 color format, in a particular color space, and of a particular TF type to a 10 bit signal with a 4:2:0 color format in a different color space and using a different TF. The signals may also be of a different spatial resolution.

The subtractor 221 may be coupled to the format converter 210 and may receive the format converted signal generated by the format converter 210. The subtractor 221 may generate data representing a difference between a source pixel block and a reference block developed for prediction. The transform unit 222 may convert the difference to an array of transform coefficients, e.g., by a discrete cosine transform (DCT) process or wavelet transform (box 274 of FIG. 2A). The quantizer unit 223 may quantize the transform coefficients obtained from the transform unit 222 by a quantization parameter QP (box 276 of FIG. 2A). The entropy coder 224 may code the quantized coefficient data by run-value coding, run-length coding, arithmetic coding or the like, and may generate coded video data, which is output from the encoder system 200 (box 282 of FIG. 2A). The output signal (box 284 of FIG. 2A) may then undergo further processing for transmission over a network, fixed media, etc. The output of the entropy coder 224 may be transmitted over a channel to a decoder, terminal, or data storage. In an embodiment, information can be passed to the decoder according to decisions of the encoder. The information passed to the decoder may be useful for decoding processes and reconstructing the video data.

Adjustments may also be made in the coding process described above (box 276 of FIG. 2A). For example, the encoder system 200 may include a prediction loop. The de-quantizer 231 may be coupled to the quantizer 223. The de-quantizer 231 may reverse the quantization performed by the quantizer 223. The de-transform unit 232 may apply an inverse transform on the de-quantized data. The de-transform unit 232 may be complementary to the transform unit 222 and may reverse its transform operations.

The adder 233 may be coupled to the de-transform unit 232 and may receive, as an input, the inverse transformed data generated by the de-transform unit 232. The adder 233 may also receive an input from the motion compensation unit 251. That is, a prediction signal, which may be generated in a mode decision stage 252, may be added to the residual via adder 233. The adder 233 may combine its inputs and output the result to the de-blocking unit 234.

Further adjustments may be made via in-loop processing in the coding processes described above. For example, de-blocking and SAO filtering may be performed within an inter-picture prediction loop. The de-blocking unit 234 may include a de-blocking filter that may be applied to remove artifacts of block encoding. The SAO filter 235 may be coupled to the de-blocking unit 234 to better reconstruct original signal amplitudes by reducing mean sample distortion. The filtered output resulting from application of the filters may then be stored in the DPB 236, which may store previously decoded data.

The operations of the de-quantizer 231, the de-transform unit 232, the adder 233, the de-blocking filter 234 and the SAO filter 235 may be performed on coded frames that are designated as "reference frames," frames that may serve as candidates for prediction of subsequently-received input data. Thus, the DPB 236 may store decoded reference frames. The motion estimator unit 254, the intra-mode decider unit 253, the mode decider unit 252 and the motion compensation/intra prediction unit 251 may operate as a prediction system that selects both a prediction mode and a prediction based in part on new input data and searches conducted across the decoded reference pictures stored in the DPB 236 to find matches to the new input content, as discussed below.

The inverse format converter 240 may convert the decoded data back to the format of the original input signal. The inverse format converter 240 may perform an up-conversion that converts lower or different resolution and/or formatting data to a higher or different resolution and/or formatting. For example, the inverse format converter 240 may convert the decoded data that is a 10 bit signal with 4:2:0 color format and of a particular TF, to a 12 bit signal with 4:4:4 color format and of a different TF.

Next, operations of the adjustment units—motion compensation/intra prediction unit 251, mode decider unit 252, intra-mode decider unit 253, and motion estimator unit 254—will be described (box 276 of FIG. 2A). The motion estimator unit 254 may receive the formatted input signal from format converter 210 and the decoded data from DPB 236. In an embodiment, the motion estimator unit 254 may also receive the higher quality original input as well as the inverse format converted data from the inverse format converter 240 (illustrated with the dotted lines), and thus the motion estimation may be performed using the higher quality representation signals in this embodiment. Based on received information, the motion estimator unit 254, for each desired reference, may derive motion information that would result in an inter prediction hypothesis for the current block to be coded.

The intra-mode decider unit 253 may receive the formatted input signal from format converter 210 and the decoded data from DPB 236. In an embodiment, the intra-mode decider unit 253 may also receive the higher quality original input as well as the inverse format converted data from the inverse format converter 240 (illustrated with the dotted lines), and thus the intra-mode decision may be performed using the higher quality representation signals in this embodiment. Based on received information, the intra-mode decider unit 253 may estimate the "best" intra coding mode for the current block to be coded.

The mode decider unit 252 may receive the original input signal and the decoded data from the inverse format converter 240. Also, the mode decider unit 252 may receive the formatted input signal from format converter 210 and the decoded data from DPB 236. Further, the mode decider unit 252 may receive information from the intra-mode decider unit 253 and the motion estimator unit 254. Based on received information—in particular the original input signal and the inverse format converted data—the mode decider unit 252 may select a mode of operation for the current block or frame to be coded. For example, the mode decider unit may select from a variety of mode/prediction type, block size, reference modes, or even perform slice/frame level coding decisions including: use of intra, or single or multi-hypothesis (commonly bi-predictive) inter prediction; the size of the prediction blocks; whether a slice/picture shall be coded in intra (I) mode without using any other picture in the sequence as a source of prediction; whether a slice/picture shall be coded in single list predictive (P) mode using only one reference per block when performing inter predictions, in combination with intra prediction; whether a slice/picture shall be coded in a bi-predictive (B) or multi-hypothesis mode, which allows, apart from single list inter and intra prediction the use of bi-predictive and multi-hypothesis inter prediction; and any other mode available to the encoder.

Next, operations of the in-loop processing units—de-block filter 234 and SAO filter 235—will be described (box 278 of FIG. 2A). The de-block filter 234 may receive output of adder 233, i.e., a mode output by mode decider 252 and an inverse transformed data output of de-transform unit 232. In an embodiment, the de-block filter 234 may also receive the higher quality original input as well (illustrated with the dotted lines), and thus the de-block filtering may be performed while considering the higher quality representation signals in this embodiment. That is, the de-block filtering parameters may be derived, while trying to achieve the "best" performance, e.g. reduced blockiness while retaining sharp information, for the signal representation in the higher quality representation. Based on received information, the de-block filter 234 may reduce blocking artifacts due to block-based coding. In some instances, for example, boundary detection may be based in part on the higher quality representation.

The SAO filter 235 may receive output from the de-block filter 234. In an embodiment, the SAO filter 235 may also receive the higher quality original input as well as the output from de-block filter 234 (illustrated with the dotted lines), and thus the SAO filtering may be performed using also the higher quality representation signals in this embodiment. Based on received information, the SAO filter 235 may refine a reconstructed signal and enhance the signal representation in smooth areas and/or around edges for either or both the native and the enhanced signal representation. In some instances, for example, boundary processing may be based in part on the higher quality representation.

The motion compensation/intra prediction unit 251 may receive input from the mode decider unit 252 and the decoded data from the DPB 236. Based on received information, the motion compensation/intra prediction unit 251 may generate a reference block for the current input that is to be coded. The reference block may then be subtracted from the format converted signal by the subtractor 221. Therefore, the encoder system 200 may optimize encoding operations based on the original input signal, which may have a higher resolution/quality, rather than the "in process" signal (e.g., format converted signal). This improves the quality of the encoding process, which leads to a better visual experience for the viewer at the target location.

In an embodiment, an "enhanced" display 260 may be coupled to the inverse format converter 240 to display the decoded video data. The enhanced display 260 may be configured to display the expanded characteristics provided in the original input signal.

In another embodiment, estimation may use hierarchical schemes (e.g., pyramid based motion estimation approach, multi-stage intra-mode decision approach). Here, the lower stages of the scheme may use the "in process" video data as it is less costly and these lower stages typically operate on a "coarse" representation of the signal making the use of higher quality signals (e.g., the input signal and inverse format converted signal) less beneficial. The higher stages (e.g., final stages), however, may user the higher quality signals (e.g., the input signal and inverse format converted signal); therefore, system performance would still be improved.

Figure 3:
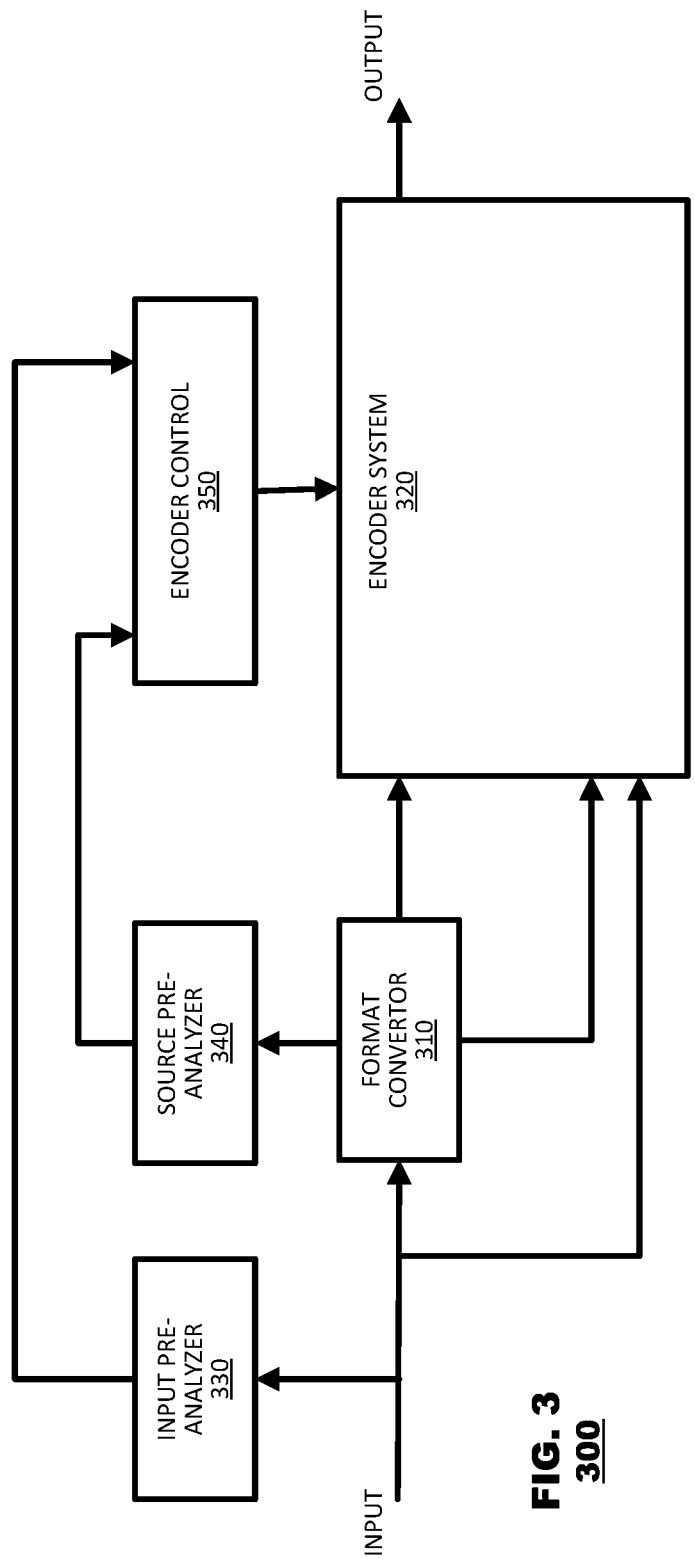
FIG. 3 illustrates a coding system 300 with adaptive coding according to an embodiment of the present invention

Techniques for optimizing video encoding described herein may also be used in conjunction with adaptive coding. FIG. 3 illustrates a coding system 300 with adaptive coding according to an embodiment of the present invention. The coding system 300 may include a format converter 310, an encoder system 320, an input pre-analyzer 330, a source pre-analyzer 340, and an encoder control 350. The format converter 310 may operate similarly as the previously described format converter 110, 210 of FIGS. 1-2. The encoder system 320 also may operate similar to the previously described elements of FIG. 1 (elements 120-160) and FIG. 2 (elements 221-260). Therefore, their description will not be repeated here.

The input pre-analyzer 330 may derive information regarding the input signal. For example, information regarding areas that may be considered more important than other areas may be derived. The source pre-analyzer 340 may derive information regarding the format converted signal, i.e., the "in process" signal.

The encoder control unit 350 may receive information from the input pre-analyzer 330 and source pre-analyzer 340, and may adjust coding decisions accordingly. For example, the coding decisions may include rate control quantization parameter decisions, mode decisions (or other decisions impacting mode decisions), motion estimation, SAO control, de-blocking control etc. In an embodiment, quantization parameters may be allocated to areas based on the original input signal. This may improve quality because the quantization parameters are based on the original target space rather than only the "in process" space.

In an embodiment, methods and systems provide an optimization for an SAO process for an extended space that does not include a combination process such as a color space conversion, e.g., using two or more color components. For example, if the extended space involves data in higher precision, e.g. 10 or 12 bit instead of 8 bit data, or a 4:4:4 or 4:2:2 signal instead of 4:2:0, then distortion for each impacted color component may be computed in its extended space. For a bit depth expansion case, distortion may be computed using a higher bit depth input source for each color component. This may account for rounding operations. In an embodiment, if chroma sampling is involved, a "reference" upsampler may be used to upconvert decoded chroma data to an appropriate resolution. The impact of the downsampling and upsampling process may also be considered.

Figure 4:
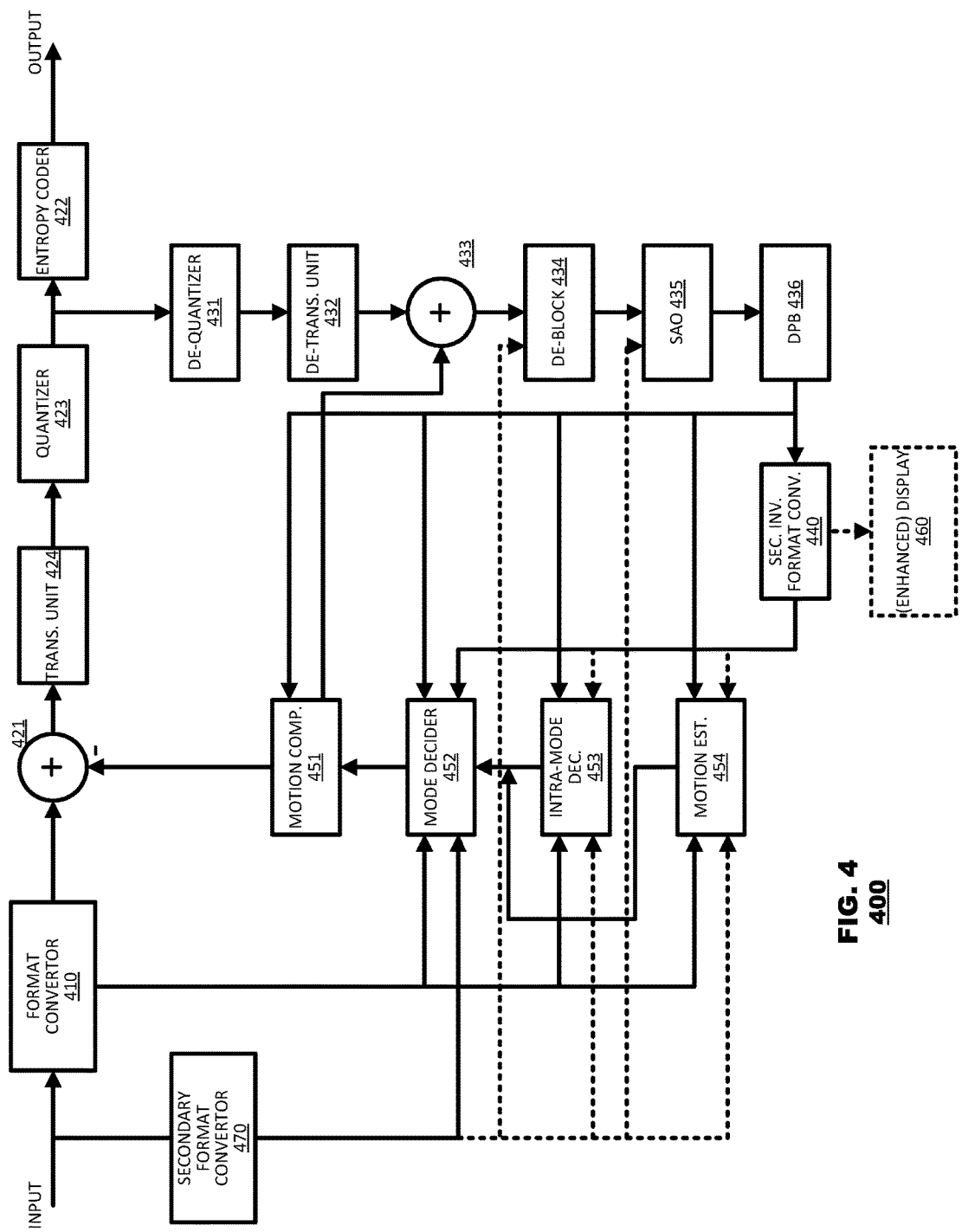
FIG. 4 illustrates an encoder system 400 with a secondary format according to an embodiment.
Figure 4A:
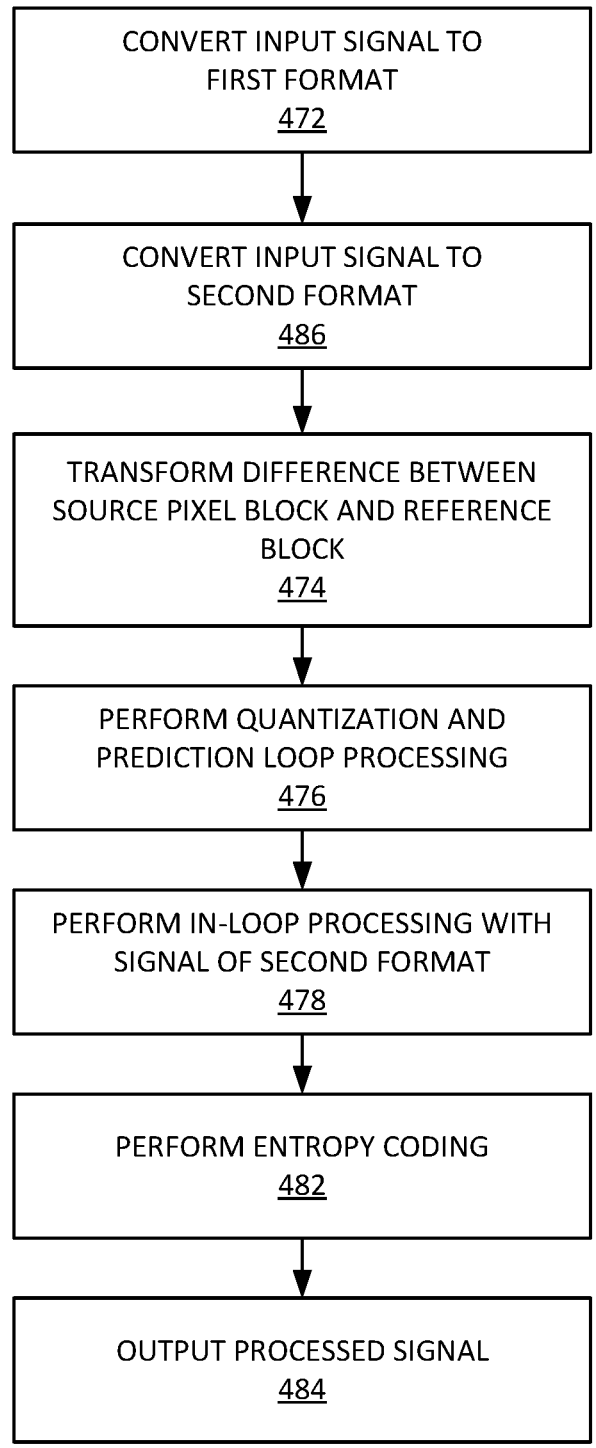
FIG. 4A is a flowchart of a method 490 to encode data.

Sometimes, the specifications of a target display may be known by the encoder. In these instances, it may be beneficial to optimize encoding operations based on the target display specifications to improve the viewer experience. FIG. 4 illustrates an encoder system 400 with a secondary format according to an embodiment. FIG. 4A is a flowchart of a method 490 to encode data. Method 490 may be implemented by encoder system 400.

The encoder system 400 may include a format converter 410 (box 472 of FIG. 4A), a subtractor 421, a transform unit 424 (box 474 of FIG. 4A), a quantizer unit 423 (box 476 of FIG. 4A), an entropy coder 422 (box 482 of FIG. 4A), a de-quantizer unit 431, a de-transform unit 432, an adder 433, in-loop processing (box 478 of FIG. 4A) such as a de-blocking unit 434 and an SAO filter 435, a DPB 436, a secondary format converter 470, a motion compensation/intra prediction unit 451, a mode decider unit 452, an intra-mode decider unit 453, a motion estimator unit 454, and a secondary inverse format converter 440. In an embodiment, the encoder system 400 may also include an "enhanced" display 460. All components, except the secondary format converter 470 and secondary inverse format converter 440, are described above in the discussion of FIGS. 1-3 and their description will not be repeated here.

The secondary format converter 470 may convert the input signal into a secondary format of a target display device (box 486 of FIG. 4A). For example, the target display may be an HDR display whose specifications, such as particular TF, peak brightness, higher resolution, etc., may be different from that of the original input signal and the format converter 410. The secondary format converter 470 may then be configured to the same specifications as the target display, and provide second format converted signal to the adjustment units such as the mode decider unit 452 (and optionally the intra-mode decider unit 453 and motion estimator unit 454) for use instead of the original input signal as described above in the FIGS. 1-3 discussion. The secondary inverse format converter 440 may be complementary to the secondary format converter 470 and may convert the decoded data to a secondary format rather than a format of the original input signal. As a result, the encoding process may be optimized for the target display capabilities.

Typical methods (e.g. the HM reference software of HEVC, or the JM reference software of AVC) consider only a best mode output by a mode decider, and the mode decider usually does not output more than one mode decision. Methods and systems of the present disclosure provide consideration of N-best mode optimization for SAO and/or other last stages decision steps that follow a mode decision process. Consideration of the N-best modes could optionally be considered to improve the decision process using extended spaces.

Figure 5:
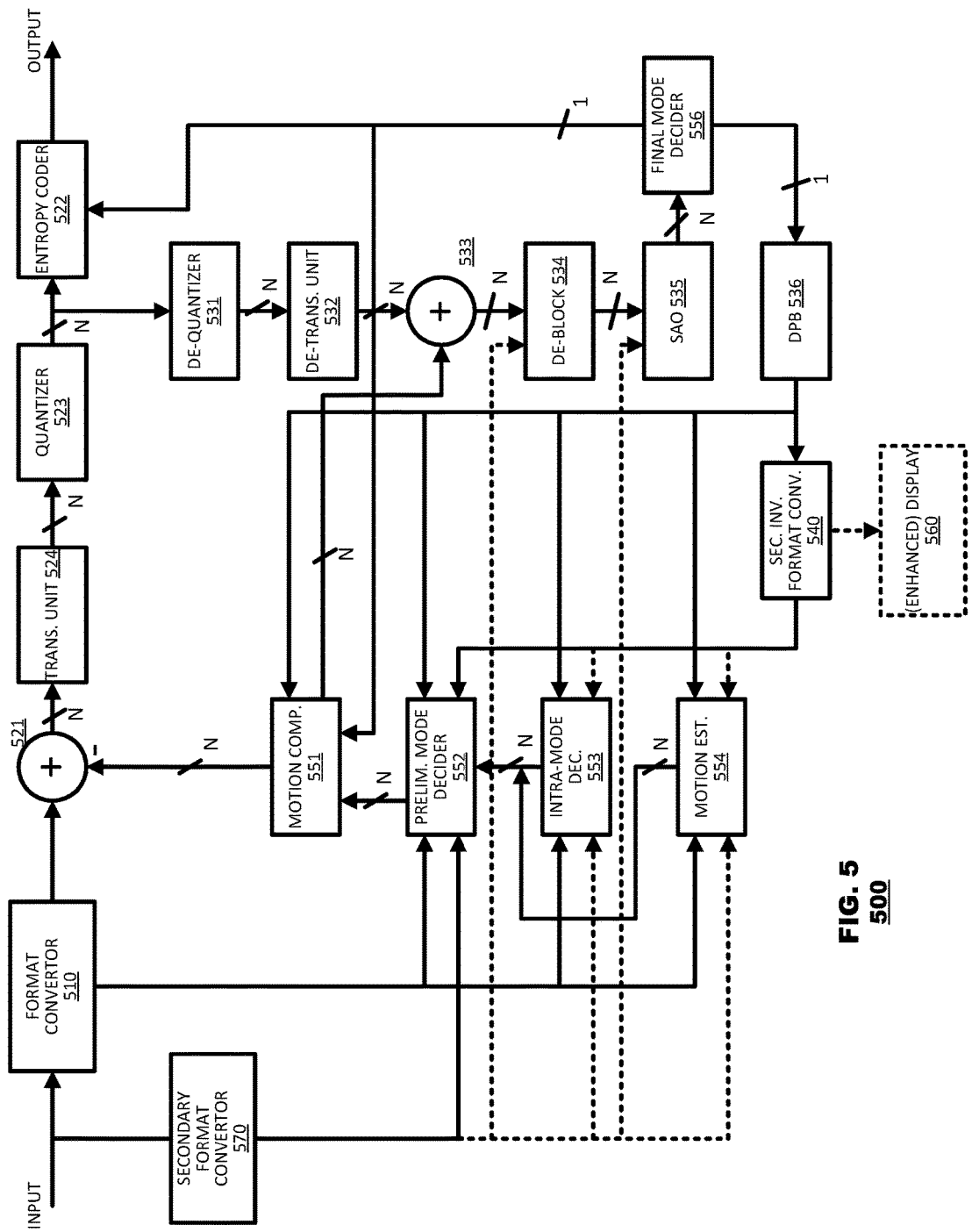
FIG. 5 illustrates an encoder system 500 with a secondary format and a final mode decider 556 according to an embodiment
Figure 5A:
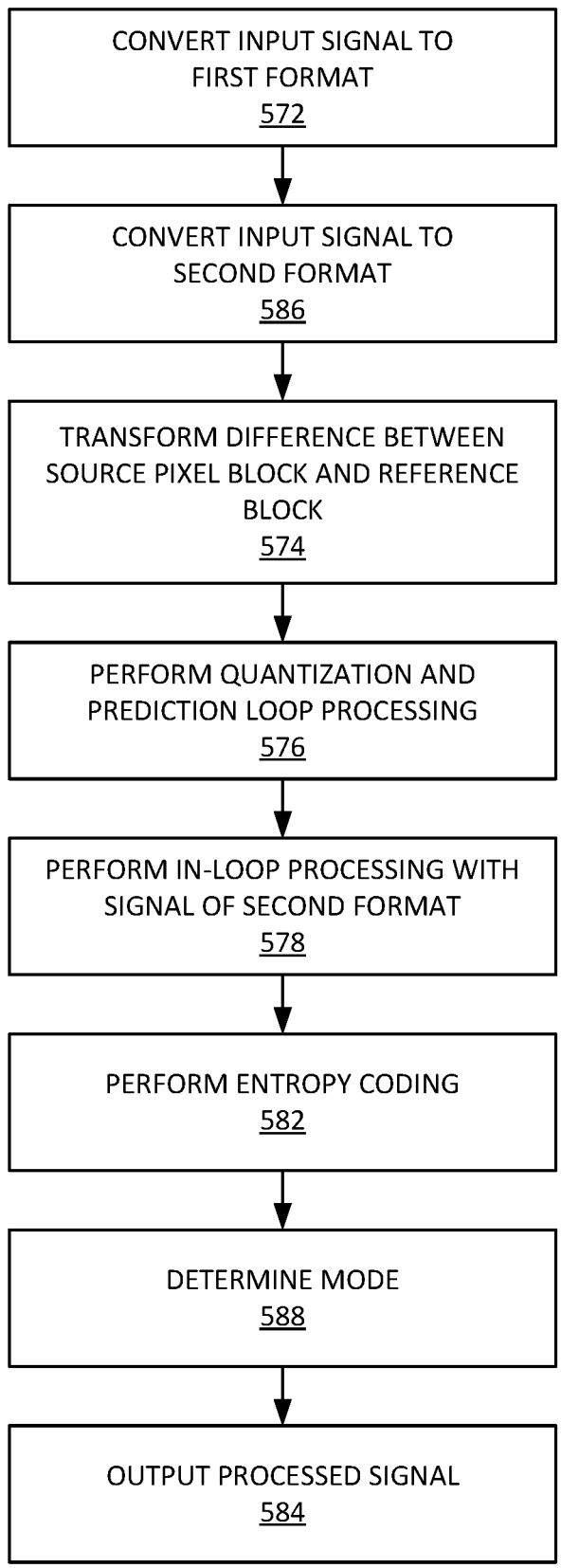
FIG. 5A is a flowchart of a method 590 to encode data.

FIG. 5 illustrates an encoder system 500 with a secondary format and a final mode decider 556 according to an embodiment. SAO, or other "last stages" encoding, may be applied not only on a "best-mode" determined by a preliminary mode decider 552, but also on a second up to N-best mode, if desired. This may provide further encoder optimization. FIG. 5A is a flowchart of a method 590 to encode data. Method 590 may be implemented by encoder system 500.

The encoder system 500 may include a format converter 510 (box 572 of FIG. 5A), a subtractor 521, a transform unit 524 (box 574 of FIG. 5A), a quantizer unit 523 (box 576 of FIG. 5A), an entropy coder 522 (box 582 of FIG. 5A), a de-quantizer unit 531, a de-transform unit 532, an adder 533, in-loop processing (box 578 of FIG. 5A) such as a de-blocking unit 534, an SAO filter 535, a DPB 536, a secondary format converter 570, (box 586 of FIG. 5A), a motion compensation/intra prediction unit 551, a preliminary mode decider unit 552 (box 588 of FIG. 5A), a final mode decider 556, an intra-mode decider unit 553, a motion estimator unit 554, and a secondary inverse format converter 540. In an embodiment, the encoder system 500 may also include an "enhanced" display 560. All components except the preliminary mode decider 552 and the final mode decider 556 are described above in the discussion of FIGS. 1-4, and their description will not be repeated here.

The preliminary mode decider unit 552 may receive an original input signal and a decoded data from the secondary inverse format converter 540. Also, the preliminary mode decider unit 552 may receive the formatted input signal from format converter 510, the secondary-formatted input signal from secondary format converter 570, and the decoded data from DPB 536. Further, the preliminary mode decider unit 552 may receive information from the intra-mode decider unit 553 and the motion estimator unit 554. Based on received information—in particular the original input signal, the secondary inverse format converted data—the preliminary mode decider unit 552 may select one or more modes of operation for the current block or frame to be coded (represented as N modes in FIG. 5). For example, the mode decider unit may select from a variety of mode/prediction type, block size, reference modes, or even perform slice/frame level coding decisions including: use of intra, or single or multi-hypothesis (commonly bi-predictive) inter prediction; the size of the prediction blocks; whether a slice/picture shall be coded in intra (I) mode without using any other picture in the sequence as a source of prediction; whether a slice/picture shall be coded in single list predictive (P) mode using only one reference per block when performing inter predictions, in combination with intra prediction; whether a slice/picture shall be coded in a bi-predictive (B) or multi-hypothesis mode, which allows, apart from single list inter and intra prediction the use of bi-predictive and multi-hypothesis inter prediction; and any other mode available to the encoder.

The motion compensation/intra prediction block 551 uses the mode decision information from preliminary mode decider 552 to generate the prediction signal. This signal may be sent to the subtractor 521 and the adder 533. Subtractor 521 may facilitate creation of residual signals based on a prediction signal. Adder 533 may facilitate combination of reconstructed residuals, after transform and quantization processes have been performed. In an embodiment, the preliminary mode decider 552 includes a motion compensation loop and transform and residual blocks.

In an in-loop-processing-based mode decision, reconstructed data may be received for N candidate modes. In other words, the encoder system 500 may generate and transmit N reconstructed blocks via the adding stage 533 so that the in-loop processes, e.g., the SAO filter 535 receives pixel data for each of the modes for a current block and/or picture. For example, the SAO filter 535 may receive N possible errors to be added, one for each motion compensation block. The de-block filter 534 and the SAO filter 535 may then operate on N re-constructed blocks passed via the adder 533. The SAO filter 535 may output a filter result for each of the pixel blocks corresponding to the N modes to final mode decider 556. The final mode decider 556 may then select a "best" mode from among the pixel blocks corresponding to the N modes that have been subject to in-loop processing, e.g., by the de-block filter 534 and the SAO filter 535. That is, SAO, or other "last stages" encoding, may be applied not only on a "best-mode" determined by a preliminary mode decider 552, but also on a second up to N-best mode.

The final mode decider 556 may output the "best" mode to DPB 536 (box 288 of FIG. 5A). As a result, the encoding process may be further optimized. The encoder system 500 may include a multi-stage predictor decision scheme. The preliminary mode decider 552 may include a plurality of mode decision units corresponding to different formats (not shown). Each mode decision unit may make its decision independently (in isolation). Then each decision may be weighted based on different factors. Based on the weighted decisions, the final mode decider 556 may select an optimal mode and/or other predictor decision. The reconstructed signal may be output to the DPB 536 and the mode and/or decision may be output to other blocks such as the entropy coding module. Other blocks, such as the motion estimation block 554 and preliminary mode decision block 552, may also use this information for other purposes, e.g. for coding mode and motion information or assisting the estimation process of future blocks.

Although FIGS. 2-5 show a single format converter, it is possible that an encoder system may include a plurality of format converters and complementary inverse format converts to convert an input signal to different formats. The concepts described herein may be applied to an encoder system implementing more than one encoding process generating different output streams. Each process may use different encoding parameters. The bitstreams could be optimized separately or jointly (i.e., by reusing information such as motion, mode, or pre-analysis statistics, etc.) using the techniques described herein for coding optimization. The concepts described herein may also be implemented in a scalable encoder environment. A scalable encoder system may generate a base-layer output and an enhanced-layer output. Either or both of these outputs may be generated applying the techniques described herein of using an original input signal (or secondary formatted signal(s)) in respective encoding operation adjustments.

In another embodiment, methods and systems provide a decision process for an extended space involving a combination process, such as color space conversion. A combination process may create dependencies between different color components. To optimize using extended spaces, the dependencies may be accounted for during the encoding process. That is, some knowledge about the behavior of all dependent color components may be used for making an encoding decision using the extended space.

Figure 6:
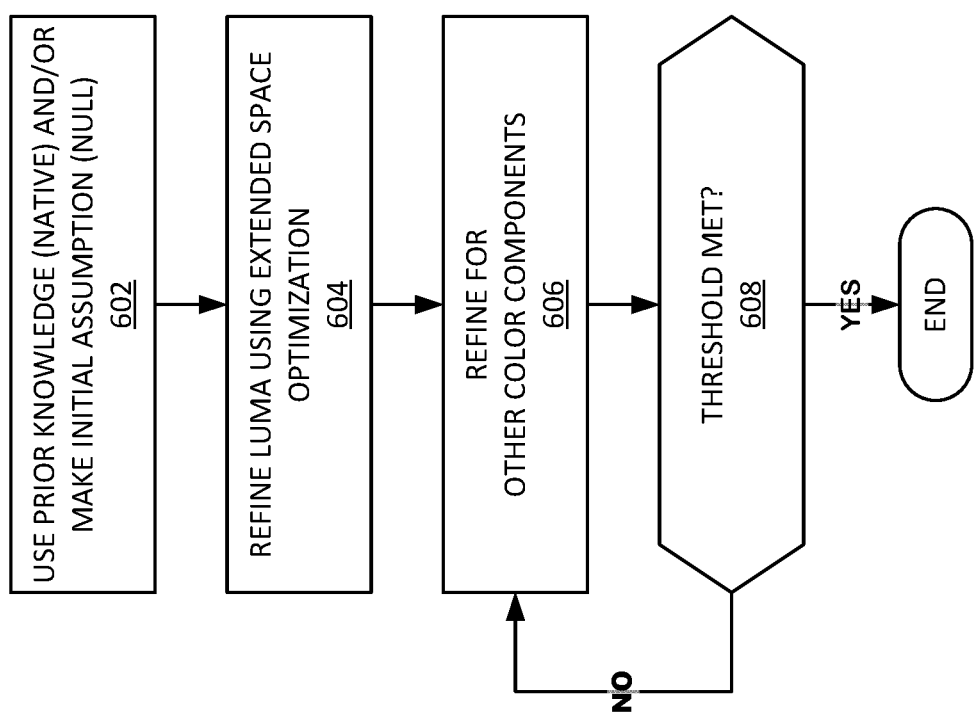
FIG. 6 is a flowchart of a decision process 600 according to an embodiment

FIG. 6 is a flowchart of a decision process 600 according to an embodiment. For example, to determine SAO parameters for luma components, e.g. in a Y'CbCr 4:2:0 color space, while trying to optimize performance for an R'G'B' space, a decision may be based on prior knowledge, or based on initial assumptions about a coding decision of the Cb and Cr components (602). For instance, an assumption may be that no SAO would be applied to chroma components (NULL case). As another example, the chroma components may be initially optimized in their native space (NATIVE case). In other words, the method may reduce only chroma component distortion in the NATIVE case. Then, in 604, the method 600 may use the NULL and/or NATIVE chroma SAO results to refine a luma SAO offset value using the extended space optimization. That is, the method 600 may compute the luma SAO values given an initial estimate of the chroma SAO offset values. In this case, SAO distortion in the extended space may be computed by optimizing the luma SAO offset values, while keeping the SAO offset values for the chroma components fixed. The method 600 may then proceed to 606 to refine the SAO offset values for the other color components, e.g. for the Cb component, in the extended space, while fixing the SAO offsets for the other color components.

According to an embodiment, instead of considering a single initial state, e.g. NULL or NATIVE, for the color component offsets in 602, all states may be considered in parallel. The offset that results in best performance between the separate state refinements can then be selected as the overall best SAO offset for the luma component in 604. This may then be used for refining the SAO offsets for other components in 606.

This refinement process could iterate across all color components until a threshold is met (608). The threshold may be defined in a variety of ways. By way of non-limited example, the threshold may include: no further performance benefits are observed, achievement of a predefined performance improvement, any number N of iterations, etc.

According to an embodiment, more states could be included in the optimization process. In particular, the NULL SAO offsets may be considered for one of the color components, e.g. Cb, and the NATIVE offsets for the other color component(s). This can introduce, for example, two additional states by switching between the two color components. Additional states could also be introduced by considering not just the best mode after the mode decision process, but the N-best modes. For each of these modes, NULL and NATIVE offsets for the color components could also be computed and considered for any subsequent refinements.

According to an embodiment, full optimization may be performed in a final refinement stage rather than refining an SAO offset for each color component. Commonly, SAO optimization for a color component is performed by first determining the SAO offsets that result in the least distortion. This is followed by reducing (or increasing if the offset is negative) the offset from this initial value towards zero and evaluating jointly a rate distortion performance of this reduction. The offset with a "best" rate distortion performance is then considered as a winner. However, for optimization using extended spaces, this process may be too costly given also possible additional iterations and refinements. In an embodiment, instead of refining the SAO offset for each color component until the best rate distortion performance point is reached at each iteration, a method may initially decrease or increase an offset to zero by a pre-definable K values. When the method reaches a final refinement step for each component, full optimization may then be performed. This may reduce complexity and also may help avoid being trapped at local minima during an optimization process.

As discussed earlier, the above steps can also be applied to other "last stages" encoding processes that may exist in current or future codecs. This may include de-blocking, adaptive loop filtering, debanding, and deringing, as well as a combination thereof among others.

Although the foregoing description includes several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims. For example, embodiments of the present invention may provide a method of coding; a non-transitory computer readable medium storing program instructions that, when executed by a processing device, causes the device to perform one or more of the methods described herein; a video coder, etc.

As used herein, the term "computer-readable medium" may include a single medium or multiple media, such as a centralized or distributed database, and/or associated caches and servers that store one or more sets of instructions. The term shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

The present specification describes components and functions that may be implemented in particular embodiments which may operate in accordance with one or more particular standards and protocols. However, the disclosure is not limited to such standards and protocols. Such standards periodically may be superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

For example, operation of the disclosed embodiments has been described in the context of servers and terminals that implement encoding optimization in video coding applications. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

In addition, in the foregoing Detailed Description, various features may be grouped or described together the purpose of streamlining the disclosure. This disclosure is not to be interpreted as reflecting an intention that all such features are required to provide an operable embodiment, nor that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

Also, where certain claims recite methods, sequence of recitation of a particular method in a claim does not require that that sequence is essential to an operable claim. Rather, particular method elements or steps could be executed in different orders without departing from the scope or spirit of the invention.

What is claimed is:

1. A video compression method, comprising:
   converting a video signal from a first format to a second format used by a video encoder;
   combining a predicted video signal in the second format with the video signal in the second format to produce a residual video signal in the second format;
   coding the residual video signal by the video encoder using selected coding parameters;
   decoding the coded data that are output by the video encoder to produce decoded data in the second format;
   filtering with a first input of the decoded data in the second format and a second input of the video signal in the first format, and producing filtered decoded data in the second format using both the first input and the second input;
   storing the filtered decoded data in a decoded picture buffer; and
   predicting the predicted video signal in the second format from the stored filtered decoded data in the decoded picture buffer.

2. The video compression method of claim 1, wherein the filtering operates on decoded data in the format of the video encoder.

3. The video compression method of claim 1, wherein the stored pictures are represented in the format of the video encoder.

4. The video compression method of claim 1, wherein the filtering operates on decoded data at a size smaller than a picture.

5. The video compression method of claim 1, wherein the second input is used to determine filtering parameters that include de-blocking filter parameters, and the filtering comprises:
   applying a de-blocking filter to decoded data using the de-blocking filter parameters.

6. The video compression method of claim 5, wherein applying the de-blocking filter comprises performing boundary detection using the first format.

7. The video compression method of claim 1, wherein the second input is used to determine filtering parameters that include sample adaptive offset filter parameters, and the filtering comprises:
   applying a sample adaptive offset filter to decoded data using the sample adaptive offset filter parameters.

8. The video compression method of claim 7, wherein applying the sample adaptive offset filter comprises performing boundary processing on the decoded data based at least in part on parameters derived from the video signal in the first format.

9. The video compression method of claim 1, further comprising:
   converting the decoded data from the format used by the video encoder to the first format; and
   selecting the coding parameters according to:
      a prediction based at least in part on a comparison between the video in the format used by the video encoder and the decoded data in the format used by the video encoder, and
      an estimate of distortion measured between the video in the first format and the decoded data converted to the first format.

10. The video compression method of claim 9, wherein the prediction is selected to minimize the estimated distortion.

11. The video compression method of claim 1, further comprising:
    selecting a preliminary frame coding mode based at least in part on an input frame in the first format and the stored pictures converted to the first format.

12. The video compression method of claim 1, further comprising:
    selecting a frame coding mode from a plurality of preliminary frame coding modes.

13. The video compression method of claim 1, further comprising:
    converting a stored picture to the first format.

14. The video compression method of claim 1, further comprising converting the stored pictures to the first format by upsampling from the format used by the video encoder.

15. The video compression method of claim 1, wherein the first format is of higher resolution than the format used by the video encoder.

16. A video coding system, comprising:
    a first format converter that converts a video signal from a first format to a second format;
    a video codec, comprising:
       an encoder that performs motion-compensated prediction on the video signal in the second format, including a subtractor that combines predicted images in the second format with the video signal in the second format;
       a decoder that decodes portions of coded video output by the encoder and outputs decoded data in the second format;
       a filtering system having a first input of the output of the decoder in the second format and a second input of the video signal in the first format, and producing a filtered output in the second format using both the first input and the second input;
       a decoded picture buffer to store decoded pictures output by the filtering system; and
       a prediction system that selects parameters of the motion-compensated prediction.

17. The video coding system of claim 16, wherein the filtering system includes a de-blocking filter that uses the second input to determine filtering parameters.

18. The video coding system of claim 16, wherein the filtering system includes a sample adaptive offset filter that uses the second input to determine filtering parameters.

19. The video coding system of claim 16, further comprising:

a second format converter that converts portions of pictures stored in the decoded picture buffer to the first format, wherein the prediction system selects parameters of the motion-compensated prediction based at least in part on a comparison of the video signal in the first format and the decoded portions of pictures converted to the first format.

20. The video coding system of claim 19, wherein the prediction system comprises a motion estimator that estimates motion of image content between an input picture and stored decoded pictures based at least in part on a comparison of the input picture in the first format and the decoded portions of pictures converted to the first format.

21. The video coding system of claim 19, wherein the prediction system comprises a mode decision unit that selects a frame coding mode of an input picture based, at least in part, on a comparison of the input picture in the first format and the decoded pictures converted to the first format.

22. The video coding system of claim 19, wherein the prediction system comprises a mode decision unit that selects a frame coding mode from a plurality of preliminary frame coding modes.

23. A non-transitory computer readable medium storing program instructions that, when executed by a processing device, causes the device to:

convert a video signal from a first format to a second format;

code the converted video signal by motion-compensated prediction, the coding including combining predicted images in the second format with the video signal in the second format;

decode portions of the coded video to produce decoded data in the second format;

filter with a first input of the decoded data in the second format and a second input of the video signal in the first format, and producing filtered decoded data in the second format using both the first input and the second input;

store filtered picture data in a decoded picture buffer; and convert the decoded portions from the second format to the first format.

24. The non-transitory computer readable medium of claim 23, wherein the filtering comprises de-blocking filtering the decoded video using the second input to determine filtering parameters.

25. The non-transitory computer readable medium of claim 23, wherein the filtering comprises sample adaptive offset filtering the decoded video using the second input to determine filtering parameters.

26. The non-transitory computer readable medium of claim 23, wherein the instructions further cause the device to:

predict content according to the motion-compensated prediction based at least in part on an estimate of distortion measured between the first format of the video and the converted decoded portions.

* * * * *